US007307579B2

(12) United States Patent
Rees et al.

(10) Patent No.: US 7,307,579 B2
(45) Date of Patent: Dec. 11, 2007

(54) COLLISION ALERTING AND AVOIDANCE SYSTEM

(75) Inventors: Frank L. Rees, Baltimore, MD (US); William B. Cotton, Mt. Prospect, IL (US)

(73) Assignee: Flight Safety Technologies, Inc., Mystic, CT (US)

( * ) Notice: Subject to any disclaimer, the term of this patent is extended or adjusted under 35 U.S.C. 154(b) by 99 days.

(21) Appl. No.: 11/266,031

(22) Filed: Nov. 2, 2005

(65) Prior Publication Data

US 2007/0252748 A1 Nov. 1, 2007

Related U.S. Application Data

(60) Provisional application No. 60/624,982, filed on Nov. 3, 2004.

(51) Int. Cl.
*G01S 13/93* (2006.01)

(52) U.S. Cl. ............................ 342/29; 342/36; 342/57; 342/58; 342/175; 701/301; 340/961

(58) Field of Classification Search ............ 342/29-40, 342/42, 50, 52, 57, 58, 175; 701/301; 340/961
See application file for complete search history.

(56) References Cited

U.S. PATENT DOCUMENTS 4,855,748 A * 8/1989 Brandao et al. ............ 342/455
6,211,808 B1 4/2001 Rees
6,278,396 B1 * 8/2001 Tran ............................ 342/29
6,314,366 B1 * 11/2001 Farmakis et al. ........... 701/201
2002/0138200 A1 * 9/2002 Gutierrez .................... 701/301

FOREIGN PATENT DOCUMENTS

WO WO 2006124063 A * 11/2006

* cited by examiner

*Primary Examiner*—John B Sotomayor
(74) *Attorney, Agent, or Firm*—Nicole E. Coppes-Gathy

(57) ABSTRACT

A collision alerting and avoidance system for use in an aerial vehicle is presented herein. The system comprises a one low profile antenna array disposed on the aerial vehicle. The array includes a plurality of horns; a polar horn, 45-degree horns, and equatorial horns. A transmitter/receiver probe is coupled to each horn. The transmitter/receiver probes are configured to transmit electromagnetic waves and to receive an echo signal reflected from a threat obstacle. A plurality of transmitter/receiver modules are coupled to each of the transmitter/receiver probes. The transmitter/receiver modules are configured to produce electromagnetic waves for transmission and to receive the echo signal. A processor coupled to the plurality of transmitter/receiver modules controls the transmission of electromagnetic waves from the horns and processes the echo signal to provide an output signal containing information regarding the obstacle.

23 Claims, 7 Drawing Sheets

COLLISION ALERTING AND AVOIDANCE SYSTEM

PRIORITY CLAIM

This application claims priority to Provisional Patent Application Ser. No. 60/624,982, entitled "Collision Avoidance System" filed on Nov. 3, 2004, the disclosure of which is incorporated herein by reference in its entirety.

BACKGROUND

In conditions of crowded air traffic and/or low visibility, it is necessary that the pilot of one aircraft be warned of the presence of a nearby aircraft so that he may maneuver his aircraft to avoid a disastrous collision. Systems known as TCAS (Traffic Alert and Collision Avoidance System) employ an interrogator mounted on a commercial jet aircraft and transponders carried by each aircraft it is likely to encounter. In this way, an interrogation is communicated by secondary radar between the aircraft carrying TCAS and other threat aircraft in the vicinity. This is done so that an enhanced radar signal is returned to the TCAS-equipped aircraft to enable its pilot to avoid a collision. The transponder also encodes the returned radar signal with information unique to the threat aircraft on which it is installed. With TCAS, the burden is on the pilot of the TCAS-equipped aircraft to avoid a collision when an alert is received.

These systems however are very complicated and very costly and are used primarily on large commercial aircraft and required on all aircraft with more than 31 seats operating in the United States. Because of their high cost, these systems are rarely incorporated on smaller, general aviation aircraft, even when they are flying under adverse weather and traffic conditions; a situation which often leads to a collision hazard. General aviation pilots primarily rely on the "see and avoid" practice for collision avoidance and are often even reluctant to incur the cost of installing a transponder without gaining a direct collision avoidance benefit.

Presently, most unmanned aerial vehicles (UAVs) rely on operations in military restricted airspace to avoid the potential of collision with civilian aircraft. Planned operations in unrestricted portions of the National Airspace System require the ability to "see and avoid" all other air traffic; the same as for manned aircraft. Present air traffic control and TCAS type airborne systems cannot protect UAVs from non-cooperative (i.e., non-transponder equipped) aircraft collision threats. Also there is no present capability for the operator to detect a potential hazard and correct for a potential collision except to keep it in sight from the ground or from a manned chase plane. A primary radar system could provide an equivalent or better "sense and avoid" capability for these aircraft. Further, marine vehicles could also benefit from a system that detects and avoids potential hazards both small (i.e., buoys, logs, etc.) and large (i.e., other ships).

What is needed in the art is a low cost, reliable, collision avoidance system that is particularly useful to protect against a wide variety of non-cooperative vehicles.

BRIEF DESCRIPTION OF THE FIGURES

Referring now to the figures, wherein like elements are numbered alike.

SUMMARY

Figure 1:
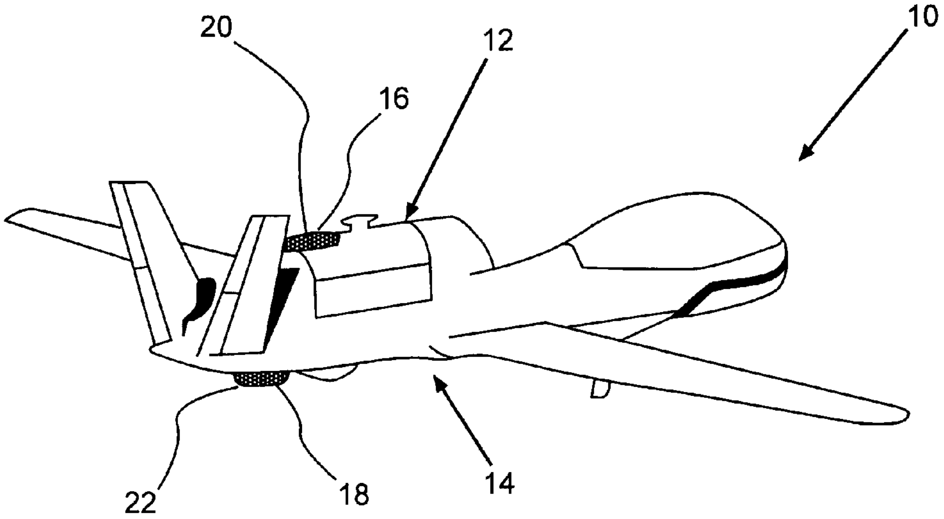
FIG. 1 is a perspective view of a large winged UAV having an exemplary antenna array of the present invention.

The disclosure is directed toward a collision alerting and avoidance system for use in an aerial vehicle. The system comprises at least one low profile antenna array disposed on the aerial vehicle. The low profile antenna includes a plurality of horns; at least one polar horn, a plurality of 45-degree horns, and a plurality of equatorial horns. The system also comprises at least one transmitter/receiver probe coupled to each of the horns. Each of the transmitter/receiver probes are configured to operate in a transmit mode to transmit electromagnetic waves and a receive mode to receive an echo signal reflected from a threat obstacle in the area of the aerial vehicle. The system also comprises a plurality of transmitter/receiver modules coupled to each of the transmitter/receiver probes. Each of the transmitter/receiver modules are configured to operate in a transmit mode to produce electromagnetic waves for transmission and a receive mode to receive the echo signal. The system also comprises a processor coupled to the plurality of transmitter/receiver modules. The processor is configured to control the transmission of the electromagnetic waves from the horns and to process the echo signal to provide an output signal containing information regarding the threat obstacle.

The system also comprises a display coupled to the processor for displaying the information to an operator of the aerial vehicle. The information enables the operator to take appropriate action to avoid the obstacle.

The system also comprises a flight control system coupled to the processor for processing the information in order to take action to avoid the obstacle.

The system also discloses that the aerial vehicle is a general aviation aircraft, and the collision alerting and avoidance system acts primarily as an alerting system. In another embodiment, the aerial vehicle is an unmanned aerial vehicle and the collision alerting and avoidance system acts primarily as an avoidance system in coordination with a flight control system.

The system also comprises a low-drag radome covering the antenna array; a plurality of communication links selected from the group consisting of TCAS, ADS-B, TIS-B, and FIS-B, coupled to the collision alerting and avoidance system.

The system also comprises a second antenna array disposed in electrical communication with the at least one antenna array and the processor. The second antenna array includes a plurality of horns including at least one polar horn, a plurality of 45-degree horns, and a plurality of equatorial horns.

The system also comprises conductive metal coating disposed on an interior of the horns.

The system discloses that the transmitter/receiver probe transmits another electromagnetic wave upon receipt of the echo signal; and the processor is configured to determine a range-rate estimation of the obstacle to the aerial vehicle by varying a pulse-repetition frequency based on the information and to determine a time to closest approach to the obstacle as a ratio of a range to the range-rate estimation. The processor is configured to transmit the electromagnetic waves simultaneously from the horns.

The disclosure is directed toward a method of using a collision alerting and avoidance system on an aerial vehicle. The method comprises disposing at least one low profile antenna array on the aerial vehicle. The antenna array includes a plurality of horns; at least one polar horn, a plurality of 45-degree horns, and a plurality of equatorial horns. The method also comprises coupling at least one transmitter/receiver probe to each of the horns; each transmitter/receiver probe is configured to operate in a transmit mode and a receive mode. The method also comprises coupling at least one transmitter/receiver module to each of the transmitter/receiver probes. The transmitter/receiver modules are configured to produce at least one electromagnetic wave in a transmit mode and to receive an echo signal in a receive mode. The method also comprises transmitting the electromagnetic wave from at least one of the transmitter/receiver probes and detecting the echo signal reflected from an obstacle in the area of the aerial vehicle in the transmitter/receiver probe and the transmitter/receiver module. The method also comprises transmitting another electromagnetic wave from the transmitter/receiver probe and the transmitter/receiver module upon receipt of the echo signal. The method also comprises processing the echo signal in a processor coupled to the transmitter/receiver modules to provide an output signal containing information regarding the obstacle.

The method also comprises determining a range-rate estimation of the obstacle to the aerial vehicle by varying a pulse-repetition frequency based on the information and determining a time to closest approach to the obstacle as a ratio of range to the range-rate estimation.

The method also comprises displaying the information to an operator of the aerial vehicle. The information enables the operator to take action to avoid the obstacle.

The method also comprises coupling a flight control system to the processor for processing the information to enable the aerial vehicle to take action to avoid the obstacle.

The method also discloses that the aerial vehicle is a general aviation aircraft or an unmanned aerial vehicle.

The method also comprises disposing a low-drag radome over said antenna array. Additionally, the method comprises electrically coupling a plurality of communication links to the collision alerting and avoidance system; the plurality of communication links are selected from the group consisting of TCAS, ADS-B, TIS-B, and FIS-B.

The method also comprises coupling a second antenna array in electrical communication with the antenna array and the processor. The second antenna array includes a plurality of horns; at least one polar horn, a plurality of 45-degree horns, and a plurality of equatorial horns.

The method also comprises disposing a conductive metal coating on an interior of the horns. Additionally, the method comprises transmitting the electromagnetic waves simultaneously from the horns.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

The present invention is a collision avoidance system that utilizes an antenna array configured to operate with a "sing-around" transmitter/receiver to detect any obstacle in its field of view. The collision avoidance system is particularly useful in general aviation aircraft, as well as for unmanned aerial vehicles (UAVs), and marine vehicles. For the purpose of this disclosure, two types of UAVs are described: large, winged UAVs and small, tactical UAVs. Both may be either remotely piloted or autonomous. In general, however, most UAVs are remotely piloted with some varying degree of autonomy.

There are two features of the present invention that set it apart from other radar systems. They are (1) the use of a fixed waveguide horn array, and (2) the use of the "sing-around" method to estimate range rate while maximizing radar information rate. The present invention utilizes an array of fixed, fuselage-mounted horns, each responsible for covering a particular sector of the surrounding volume (given by a range of azimuth angle, elevation angle and radial distance from the aircraft) such that the total coverage adds up to $4\pi$-steradians out to a range of about 4 to about 7 nautical miles, depending upon the local environmental conditions confronting the radar and the radar cross-section of the threat aircraft. The azimuth and elevation angle coverage of each sector is dependent on the antenna design and the number of horns employed. The radial range of coverage is dependent on the power, pulse duration and repetition frequency. Each horn is connected to at least one independent transmitter and receiver (T/R) module.

The present invention employs a "sing-around" control processor that synchronizes the T/R module to provide both radial range and range-rate to any threatening obstacle in its field of view. The "sing-around" method utilizes a constant pulse repetition frequency (PRF); however when a potential obstacle is detected in a particular range-cell, the return pulse (or echo of electromagnetic waves) triggers the transmission of the next pulse (or electromagnetic wave) transmission. As the range to the obstacle changes, the "sing-around" method estimates the range-rate by measuring the changing time-delay between return pulses. This reduction in time between pulses provides an accurate estimation of the range-rate and minimizes the impact of the elapsed time on making critical decisions. When the return pulse is superimposed on system noise, the reduced time-between pulses would generally not give a more accurate estimate of range rate. However, when the range is decreasing, as it does in a potential collision, the signal-to-noise ratio (SNR) increases with time. This steady increase in SNR compensates for the effect of noise on the range-rate computation.

The "sing-around" method allows for the use of relatively inexpensive and small application-specific integrated circuits (ASICS) in the T/R module. The "sing-around" method utilizes deferred decision processing to reduce the false-alarm rate for each channel. The "sing-around" method is able to adjust the PRF for affecting correspondingly rapid increases in information rate on rapidly closing targets.

As indicated above, the present invention is contemplated for use in general aviation aircraft as well as UAVs. Referring now to FIG. 1, a large, winged UAV 10 is illustrated having a top portion 12 mounted antenna array 16 and a bottom portion 14 mounted antenna array 18. Although a top mounted antenna array 16 and a bottom mounted antenna array 18 are illustrated and described herein as being used together, it is contemplated that only one antenna, either top or bottom mounted, can be utilized in some applications. The antenna array 16, 18 are mounted on the UAV 10 such that the horns (see FIG. 2) of the antenna array 16, 18 are pointing away from the UAV 10. Preferably, as illustrated in FIG. 1, and herein in FIG. 4, the antenna configuration is covered by a low-drag radome 20, 22.

Figure 2:
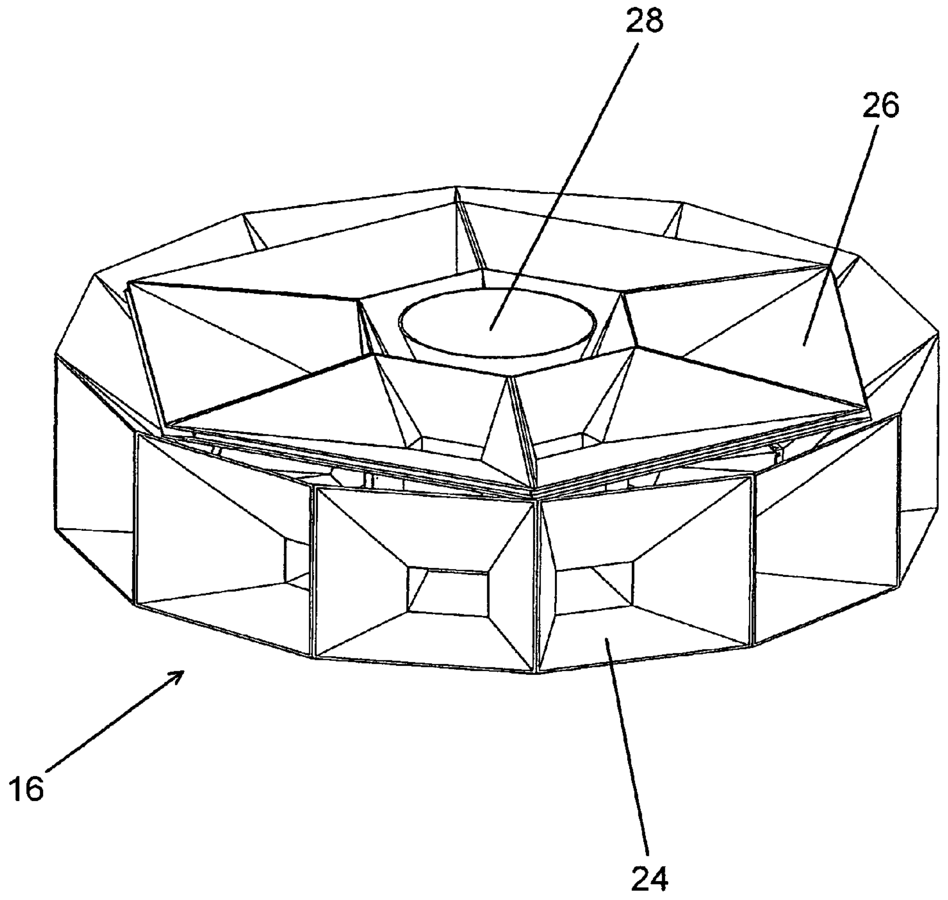
FIG. 2 is a perspective view of an exemplary antenna array of the present invention.

Referring now to FIG. 2, an exemplary narrow-band radar antenna array 16, 18 is illustrated. This exemplary antenna array 16, 18 can be disposed on either the top portion 12 or bottom portion 14 of a UAV 10, or on both. Each antenna array 16, 18 has a series of horns including at least one equatorial horn 24, at least one 45-degree horn 26, and at least one polar horn 28. In a preferred embodiment, the horns 24, 26 are disposed both radially and circumferentially about the polar horn 28 in order to transmit and receive electromagnetic waves from all possible angles in order to detect obstacles. In a preferred embodiment, both the top antenna array 16 and the bottom antenna array 18 are utilized cooperatively.

Figure 3:
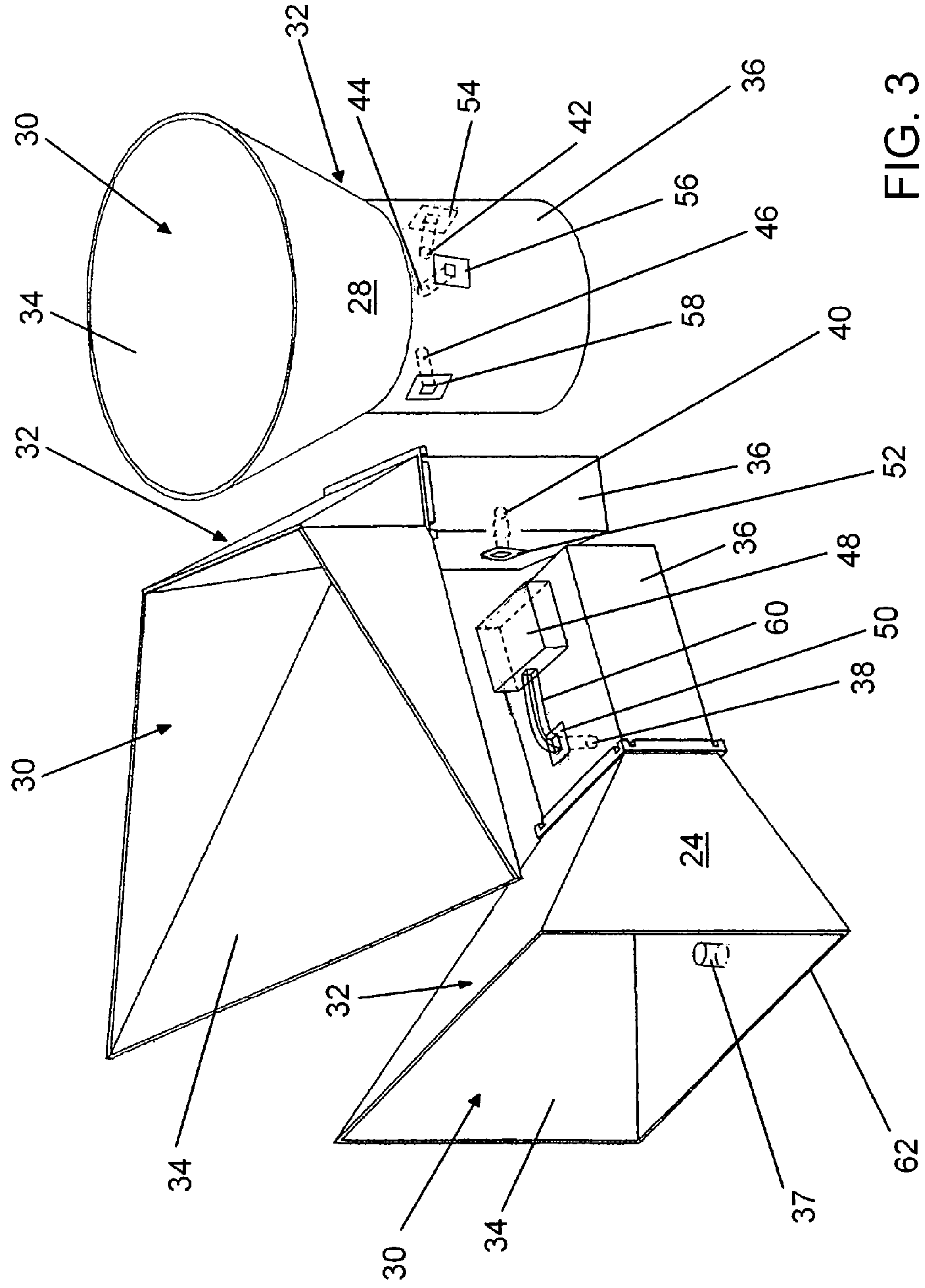
FIG. 3 is a perspective view of the individual horns of the exemplary antenna array of the present invention in FIG. 2.

As illustrated in FIG. 3, each horn 24, 26, 28 has an interior 30 and an exterior 32 opposite the interior 30, and a flared portion 34 opposite a waveguide portion 36. The horns 24, 26, 28 attach to a mounting plate (not shown), which is then disposed on the UAV 10. Referring again to FIG. 2, in one embodiment, if indicated as necessary, an electromagnetic-field choke 29 can be disposed on the flared portion 34 of the 45-degree horn 26 as a possible means to decouple the 45-degree horn 26 from the nearest equatorial horns 24 and to reduce interference between the horns 24, 26.

As illustrated in FIG. 3, the interior 30 and the exterior 32 of the horns 24, 26, 28 are illustrated. Within the interior 30 of the equatorial horn 24 is a passive parasitic probe 37 and a T/R probe 38, within the interior 30 of the 45-degree horn 26 is a T/R probe 40, and within the interior 30 of the polar horn 28 are multiple T/R probes 42, 44, 46. Each of these T/R probes 38, 40, 42, 44, 46 is connected to an individual radar T/R module 48 (illustrated only for T/R probe 38 in equatorial horn 28) via coaxial connectors 50, 52, 54, 56, 58, respectively. As illustrated with equatorial horn 24, a cable 60 couples the coaxial connector 50 with the radar T/R module 48.

Although a total of nineteen horns 24, 26, 28 are illustrated, with twelve equatorial horns, six 45-degree horns, and one polar horn, any number of horns are contemplated for use in the antenna arrays, depending on the precise requirements of the application (e.g., field of view, bearing resolution, etc.). One skilled in the art can determine the proper number of horns required for the particular application. Each of the horns 24, 26, 28 is shaped to minimize interference and to maximize the gain and achieve a requisite electromagnetic wave pattern shape as a function of elevation and azimuth. The shapes contemplated for the three types of horns are circular, rectangular, octagonal, trapezoidal, and the like. The polar horn is preferably circular. Other shapes can be readily determined by one skilled in the art based on the configuration of the other horns and the size and shape of the UAV or aircraft fuselage.

The horns 24, 26, 28 can be manufactured of any material that is easily formed, light weight, and able to withstand extreme changes in temperature. Preferred materials include a plastic material, preferably injection molded plastics. As such, the interior surface of the interior 30 of the horns 24, 26, 28 can be coated with a conductive metal coating, such as silver, copper, brass, and the like from a metal sputtering process, vapor deposition process, or equivalent process. The coating applied to the interior surface facilitates the transmission and reception of the electromagnetic waves, and either directs the waves out of the flared portion 34 or into the wave guide portion 36. It is contemplated that the conductive metal coating can also be disposed on the edge of the flared portion 34 and can extend to a portion of the exterior of the horn.

Figure 4:
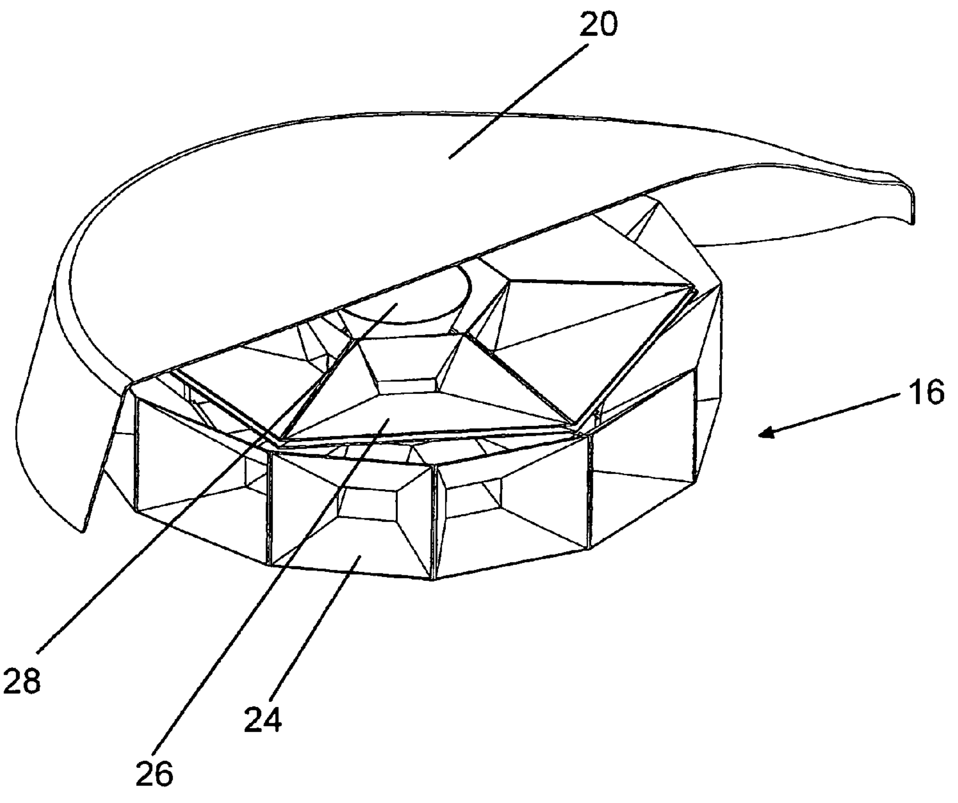
FIG. 4 is a perspective view of a radome enclosing an exemplary antenna array of the present invention.

FIG. 4 illustrates a perspective view of an antenna array 16 partially covered by a low-drag radome 20 in order to show the antenna array 16 beneath the radome 20. The low-drag radome 20 serves to reduce aerodynamic drag while protecting the antenna array 16, without interfering with the operation of the antenna array 16. In use, the radome 20 completely covers the antenna array 16.

As indicated above, the exemplary antenna 16 has nineteen horns. In this embodiment, there are a total of 20 channels for transmitting and receiving microwave signals (i.e., one per equatorial horn, one per 45-degree horn, and two for the polar horn). In order to adapt to other preferred ranges, the exemplary antenna array can be modified to have any number of horns. However, it is preferred to utilize two array antennae 16, 18 which would total thirty-eight horns in order to provide a radial range of about four to about seven nautical miles and accomplish a 4π-steradian coverage.

In use, each horn 24, 26, 28, via the T/R probe, transmits an electromagnetic wave (not shown) and is able to receive the echo of the electromagnetic wave (not shown). Each horn 24, 26, 28 can also receive the echo of transmitted electromagnetic waves generated by adjacent horns 24, 26, 28. The coated, conducting interior surface (or dielectric surface) guides (or funnels) the reflected electromagnetic waves received inwardly to the edge 62 located immediately adjacent to its associated probe 37. By detecting the echo of the adjacent horns as well, the collision alerting and avoidance system can use "angle interpolation" to more precisely determine the location of a threat aircraft (not shown). The comparison of the relative strength or phase of the received echoes of electromagnetic waves in two adjacent horns is an indication of the direction of the target in relation to the two receiving horns.

Figure 5:
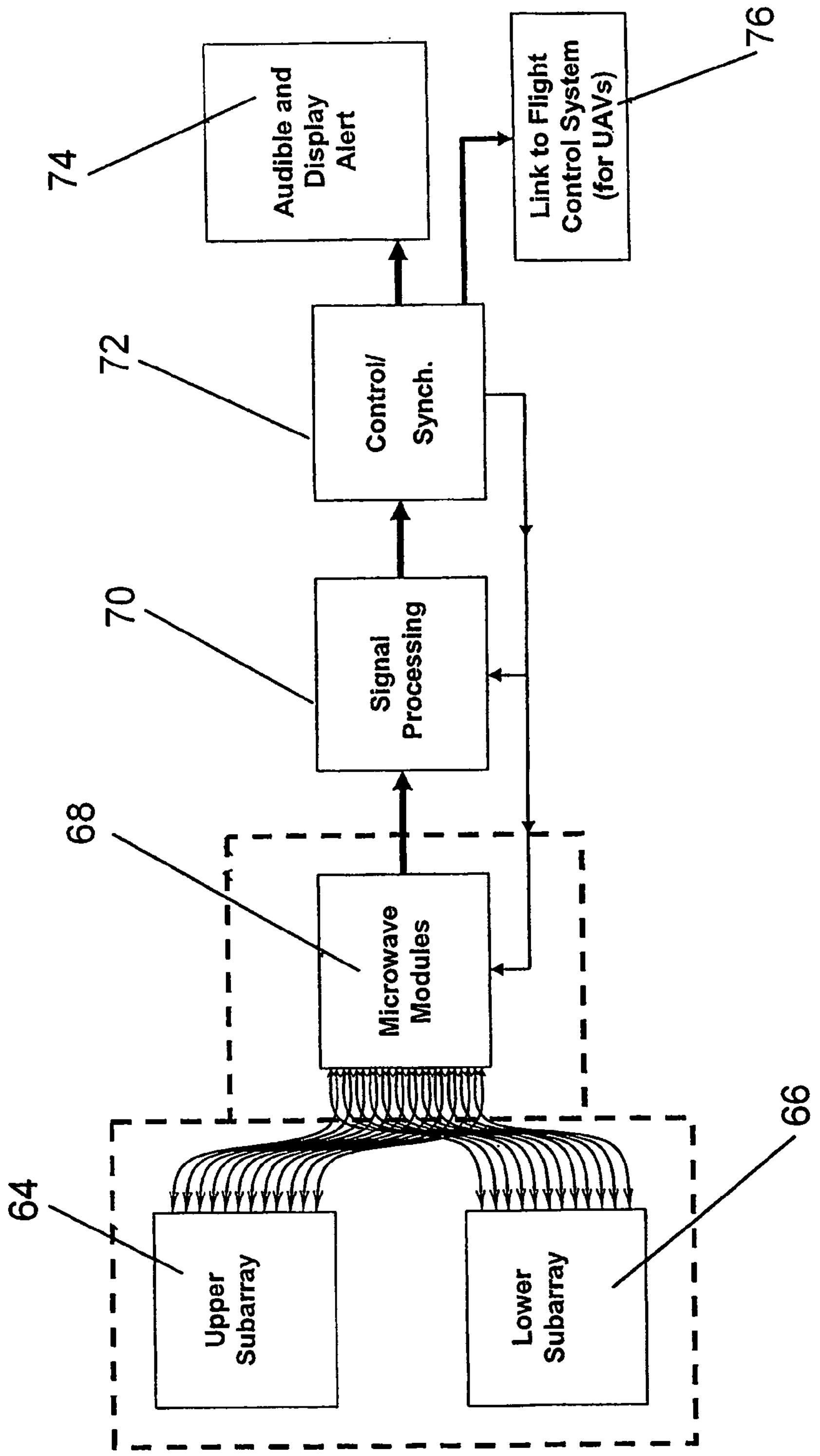
FIG. 5 is a block diagram of the system of the present invention.

FIG. 5 illustrates a block diagram of the collision alerting and avoidance system. In this embodiment, an upper antenna array 64 is utilized in conjunction with a lower antenna array 66. Each antenna array 64, 66 is electrically coupled to a radar T/R module 68 as described above and illustrated in FIG. 3. The radar T/R module 68 transmits and receives electromagnetic waves through the T/R probes. The T/R probes, when in the transmit mode, operate to drive simultaneously in phase all the horns 24, 26, 28 so as to transmit electromagnetic waves around the antenna array 64, 66. The T/R probes, when in the receive mode, operate to receive any return electromagnetic waves (or echoes) reflected back from a nearby aircraft or threat events.

The radar module 68 is electrically coupled to a signal processor 70 and a controller 72. The controller 72 decides when to transmit an electromagnetic wave from the individual microwave transmitters, based upon information received from the signal processor. When the signal processor identifies a potential target, the controller enters into "sing-around" mode, as described above. The controller 72 is connected to an existing audible and visual indicator display unit 74 mounted in the cockpit within the pilot's normal field of view. As such, the display unit is readily visible to the pilot without obstructing his normal forward view. In other embodiments, the controller 72 can be coupled to the flight control system 76, which can display information on an existing cockpit multi-function electronic display. Other electronics can be used to monitor the range and the range rate of each tracked target and calculate the ratio of these values to provide aural and visual alerting to potential collision threats.

In a preferred embodiment, the antenna array of the present invention can be mounted on an aerial vehicle and its re-transmit cycling almost immediately following after each receive cycle may be controlled by a digital clock and a counter/clock-pulse synchronizer, which is the central element in a "sing-around" feedback loop. In this way, the threat-aerial vehicle information rate may be closely matched to the threat-aerial vehicle's relative closure rate. In its quiescent mode, the clock feeds timing pulses to the pulse modulator at a minimum pulse repetition range consistent with a desired radius of a "sphere of safety" around the aerial vehicle. Pulses from the modulator are then fed to a power amplifier/oscillator, which is tuned to one of certain microwave frequencies.

It is contemplated that the collision alerting and avoidance system can be operated in two embodiments. The first embodiment supports a collision and terrain alerting, as well as ground proximity warning for use as an affordable way of autonomously providing safety for a broad class of general aviation aircraft. This embodiment utilizes a power amplifier/oscillator that drives the T/R probes of the antenna array. When in the threat-target acquisition transmit mode, the T/R modules operate to drive every horn simultaneously without phase coherency being maintained between all sectors, which thereby transmit electromagnetic waves around the antenna array and the aerial vehicle. This lack of phase coherency results in the reduction of potential adjacent electromagnetic wave interference during the post-detection integration process. Once the "sing-around" mode is initiated, after the threat-target acquisition, simultaneous transmission is perturbed in that channel (or channels), which, respectively, has or have acquired a threat target or threat targets, so that averaging reduced through the consequential reduction in the number of pulses subjected to post-detection integration is compensated by the associated lack of pulse-repetition synchronism; thereby, also avoiding electromagnetic wave interference.

The second embodiment is intended to support collision, terrain and ground-proximity avoidance for UAVs through an automatic flight controller. In addition to methods described in the first embodiment, phase coherency is needed between transmitted pulses and transmitted pulses transmitted on adjacent channels. This is accomplished by utilizing phase comparison (or logarithmic-amplitude and phase form of sum-difference signal feedback angle estimation loop) and replacing logarithmic-amplitude comparison. Such will be necessitated for improving angle-interpolation accuracy in a manner required for the UAV Detection, Sense and Avoid (DS&A) function; while also providing the degree of phase coherency required to support high resolution, space-time Synthetic Aperture Radar (SAR) ground-surveillance imaging. When phase injection locking is performed to support these UAV requisite functions, there are various forms of desired pulsed-waveform modulation and the attendant signal processing needed to support these functions; while also allowing the use of non-interfering coded pulse transmissions to avoid beam-pattern distortion during simultaneous transmissions, which actions may be facilitated through the use of phase-locked frequency "hopping" coding of "burst" waveforms. In addition, the introduction of phase coherency allows the use of multiple-pulse Doppler or moving-target-indicator (MTI) signal processing techniques for enhancing radar clutter rejection; while also improving radial-range-rate estimation accuracy; but not to the exclusion of the "sing-around method" that also maximizes radar information rate as desired for achieving optimum reaction time.

When the T/R modules are in a receive mode, any electromagnetic wave reflected off either a threat aerial vehicle, a forward-terrain feature, or the ground below (called threat events) and returning to a corresponding or adjacent sector will be detected by one of a cluster of microwave-radar T/R modules, which is associated with that sector or, for beam-interpolation purposes, an adjacent sector.

The returning echo of electromagnetic waves will provide return energy that will arrive at one of the receiver sectors close to the Maximum Response Axis (MRA) of the receiver beam pattern of that segment. Beam-angle interpolation will be performed through this and its adjacent channel, both subjected to logarithmic-amplifier compression after which a subtraction of one from the other will provide a close to linear interpolation of angle around the cross-over axis residing between the MRA of these neighboring beams.

For the non-coherent phase application to general aviation, prior to entering the bi-polar end of a bi-polar to uni-polar logarithmic amplifier, as a preferred embodiment, intermediate frequency (IF) surface-acoustic-wave (SAW) filters are used to improve the signal-to-noise ratio (SNR). These IF SAW filters have also been chosen to allow selection of one of at least two different SAW-filter bandwidths to more closely match a transmit pulse duration that is changed with the "sing-around" pulse-repetition rate so as to approximately maintain a constant pulse duty cycle. After IF filtering, the uni-polar end of each logarithmic amplifier contains detector-diode operations that provide a unidirectional rectified pulsed signal corresponding to a post-detection radar video threat-event pulse. These video pulses are first subjected to a pulse integrator that continues to accumulate multiple pulses for integration over a period determined by its beam-channel related deferred-decision (upper/lower) threshold logic. Potential threat events which exceed the upper threshold are declared as threat-event detections, while their counterparts that fall below the lower threshold are rejected as false alarms. However, the decision is deferred on counterparts which fall between these two thresholds; thereby also requiring that another video pulse be added to the integration process and subjected to retesting by the deferred-decision logic. Converging upper/lower thresholds are employed so as to naturally truncate this process before the decision-making elapse time has become too prolonged.

A sensitivity time control (STC) amplifier can be employed to reduce the dynamic range stress on the analog logarithmic amplifier and a limited dynamic range analog-to-digital converter. An STC amplifier, whose control waveform is selectively well-matched to various forms of intruding clutter, can reduce the dynamic range of clutter variations. In addition, so as to maintain a constant false alarm probability (CFAP), a fast time constant (FTC) filter or, instead, through the enhanced action of an iterative digital-processing counterpart can be employed. This is applied as a post-detection process after the logarithmic amplifier has compressed noise fluctuations to a constant standard-deviation level. The purpose of this logarithmic-amplifier/FTC filter combination is to remove any slowly time-varying mean of the clutter variations about which this logarithmically compressed fluctuating noise-waveform and any video-signal (that is subsequently passed by the FTC filter) occurs. While, at the same time, the almost pulse-duration matched IF SAW filter selected serves to limit both the clutter and the, otherwise, wide-band thermal noise to roughly the same bandwidth so that the CFAP action also translates into the constant false alarm rate (CFAR) action desired by most radars. The false contact rate (e.g., from clutter or other echoes) is further reduced by use of a split range gate that indicates when a video signal, that has exceeded its respective threshold, exactly straddles between an early and a late range gate window. This is indicated by differencing the area of the portion of the video pulse, where area is obtained through short-term integration and that falls in the early versus the late range gate. When the difference indication passes through zero, the center of the video pulse is located. Logic is provided to ensure that the first contact is normally selected. All of these actions provide a way of ensuring that adjacent channel threat-event signals are strong enough via SNR to constitute valid threat-event detection and have been localized by the range gate before the dual logarithmic-amplifier channel amplitude comparisons are made for angle-interpolation purposes.

Generally speaking, the upper sub-array of the antenna array of the present invention is used to make threat-event aerial vehicle detections, validations, (range, range-rate, azimuth-angle, elevation-angle and a tau=range/range-rate time to CPA or encounter estimation), localizations and tracking over the upper 2-pi steradians. Whereas, the lower sub-array provides much the same functions in generating terrain alerts and ground-proximity warnings; while also detecting aerial-vehicle threat events on received echoes which might occur earlier in arrival time than the terrain or ground-proximity threat events. The two arrays can be operated together to provide effective elevation resolution.

When one of the sectors detects a threat aerial vehicle and selector ultimately provides a signal, which is processed through a threshold device, and range gate and then passed onto logic circuitry, that first threat contact is selected by that circuitry and a corresponding priority output signal is captured by the "sing-around" feedback loop. Signal is passed to "sing-around" rate counter threshold circuitry, which ensures that a ground-proximity alarm will not be sounded or indicated during a normal landing glide-slope-descent rate situation. A signal is passed from the circuitry to the clock to activate the next "sing-around" feedback loop cycle.

Each of the signals from the microwave radar modules may override the first threat contact of signal by way of override determination circuitry in logic so conditioned that the output signal is representative of the highest priority threat. For example, if a ground echo were to arrive in one of the channels of the sectors, the highest priority signal (rather than the closest signal in range) selected by logic would be derived from the output signal. In addition, the conditioning logic can facilitate the interleaving of transmit cycles to be associated with another iterated sequence of the "sing-around" subsystem that also captures aerial threat events occurring as an earlier echo arrival in the receiver.

The "sing-around" rate control/threshold already has been described above. It is noted that apart from maximizing the information rate in concert with a shortening time to react during the relative closing of a threat target, because radial-range information is implicit in the time between "sing-around" feedback loop cycles, the changes in the PRF of those cycles convey information on relative radial-range closure rate. This latter quantity is an important measure in gauging the imminence of a collision. However, under certain low closure rate circumstances (e.g., the descent rate in approaching ground proximity during a normal glide-slope landing), an audible alarm or a visual warning indication would be distracting. Therefore, by countering and applying a threshold to the rate-of-change in radial range occurring at time information may be derived in order to prevent the "sing-around" feedback loop from being prematurely triggered during benign circumstances. Then, the triggering of a ground-proximity warning, for example, is only affected when logic dictates it is reasonable to consider the event as possibly threatening; otherwise, the controller returns the "sing-around" feedback loop to its quiescent state.

The aural and visual display symbols are designed to provide the pilot with rapid, unambiguous and clear indications of impending collision situations. The present invention also provides concise information that would enable an immediate autonomous collision avoidance maneuver or sufficient early warning to not only obviate a collision but, also, to facilitate reducing the chance of a near miss. The cockpit speaker can be used to reproduce various audible alarm messages.

There is a desire to make the present invention compatible with other cooperative collision alerting systems, which may be present on other types of aircraft and aerial vehicles. For example, smaller aircraft lacking a strong radar cross section (RCS) may respond to a transponder interrogation or may provide an Automatic Dependent Surveillance-Broadcast (ADS-B) message with GPS position (if available) and other information useful in rapidly assessing the likelihood of a collision. The antenna array for such may be fabricated as an L-band pair of cross-dipole antenna etched into one or both sides of a sheet of plastic substrate onto which conducting surfaces were bonded. Other T/R module components may have leads etched into the conducting sheet connecting with the antenna with the whole assembly further laminated in a flexible plastic a wrap-around and zip Elizabethan-type collar sandwich. Such a sandwich would be designed to be capable of being opened for insertion and, then, zipped-up into position when settled into a wedge-like space existing in between the equatorial horns and the 45-degree tilted horns. Along with the necessary received interrogation the decoding and message encoding repeater electronics, which may be accommodated with the microwave-radar modules mounted inside of the radome cavity, the sandwich antenna required for this combined mode may be easily accommodated as an upgraded option. In addressing a concern about mutual interference, which would be much less prevalent with the lower microwave power levels associated with a system of the present invention, for example, relative to an L-band full-blown TCAS system, a "whisper and shout" mode might be employed. This "whisper and shout" mode entails the pulsing of the PA/OSC module to radiate lower power during the quiescent mode than would be employed at full power once an alert cycle was being initiated.

An upgrade to the collision avoidance system can include an ADS-B communications and surveillance link. ADS-B, with the associated broadcast services called Traffic Information Service-Broadcast (TIS-B) and Flight Information Service-Broadcast (FIS-B), can be made available through a C-band or a S-band antenna array of the present invention. The traffic information from such cooperatively-equipped aircraft can be correlated with the present invention's primary radar returns.

In another embodiment, the present invention is also designed to be utilized on small, tactical UAVs. Small, tactical UAVs are used to detect smaller, close-in fixed targets, constituting obstacles, such as power lines, telephone poles and trees, as well as airborne targets such as other UAVs. In order to detect smaller, close-in fixed targets using the collision avoidance system of the present invention, a higher radial range resolution is required. It is contemplated that an ultra-wide band (UWB) version of the present invention must be utilized for small, tactical UAVs in order to obtain the necessary range resolution.

Figure 6:
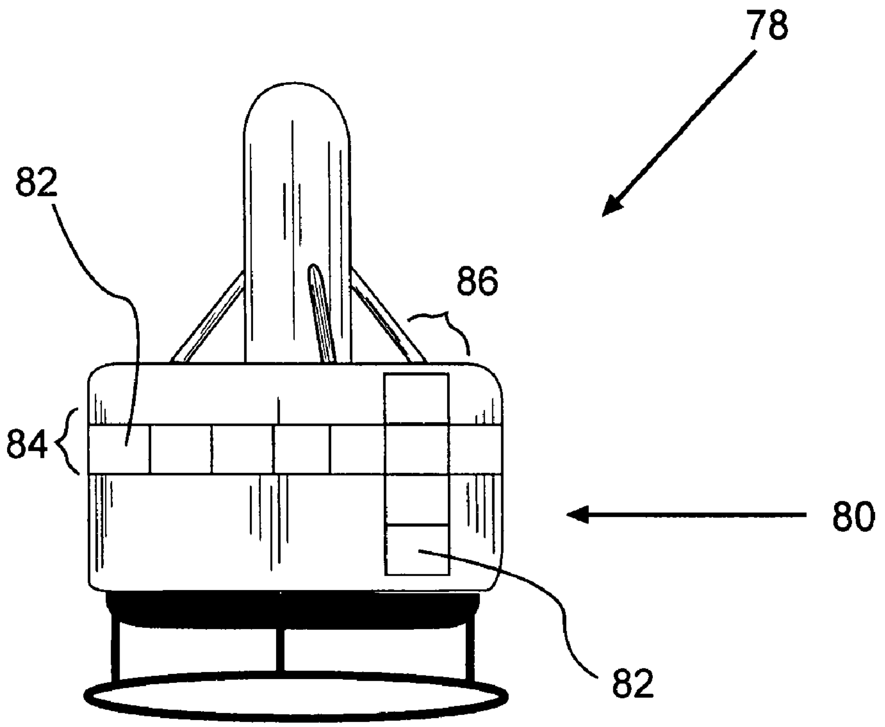
FIG. 6 is a side view of a conventional small, tactical UAV having a patch antenna array of the present invention.

As illustrated in FIG. 6, a conventional small, tactical UAV 78 is illustrated having an array 80 of patch-array antenna 82. Although a total of ten patch-array antenna 82 are illustrated, any number of patch-array antennae 82 is contemplated, depending on the precise requirements of the application (e.g., field of view, bearing resolution, etc.). One skilled in the art can determine the proper number of patch-array antenna 82 required for the particular application.

A patch (or microstrip patch)-array antenna 82 is a microwave antenna, which consists of a thin metallic conductor bonded to each side of a thin grounded dielectric substrate. Each individual patch-array antenna 82 independently operates to transmit and receive signals. When combined with other patch-array antenna, a phased array is formed that is capable of covering a larger multiple fixed-beam coverage area. Patch-array antenna, generally, are utilized when wide band (WB) or UWB band transmission and reception is desired.

The patch-array antenna 82 may be distributed as a conformal array 80 on the outer shell of the UAV 78 airframe with their microwave T/R components integrated into a package (not shown) mounted immediately behind each patch-subarray antenna module. This is because multiple modes within waveguides or substantial fringe-field losses with long lines of patch antenna 82, generally, rule out the WB or UWB use for communicating microwave electromagnetic energy over long lengths between the T/R subarrays groups 84, 86. This does not apply if the proximities of these subarrays 84, 86 are somewhat overlapped or immediately contiguous to one another in a compact array whose so limited field-of-view could satisfy operational needs. It is contemplated that the appropriate configuration of the patch-array antenna for sensing pending collisions can be readily determined by one skilled in the art. The array 80 of patch-array antenna 82 can be operated utilizing the "sing-around" method as described herein. One skilled in the art can readily determine the appropriate components for implementing the "sing-around" with the patch-array antenna 82.

In yet another embodiment, the collision avoidance system of the present invention can utilize both narrow-band and UWB versions. The narrow-band version is designed to detect large, distant obstacles, while the UWB version is designed to detect small, close-in obstacles.

Figure 7:
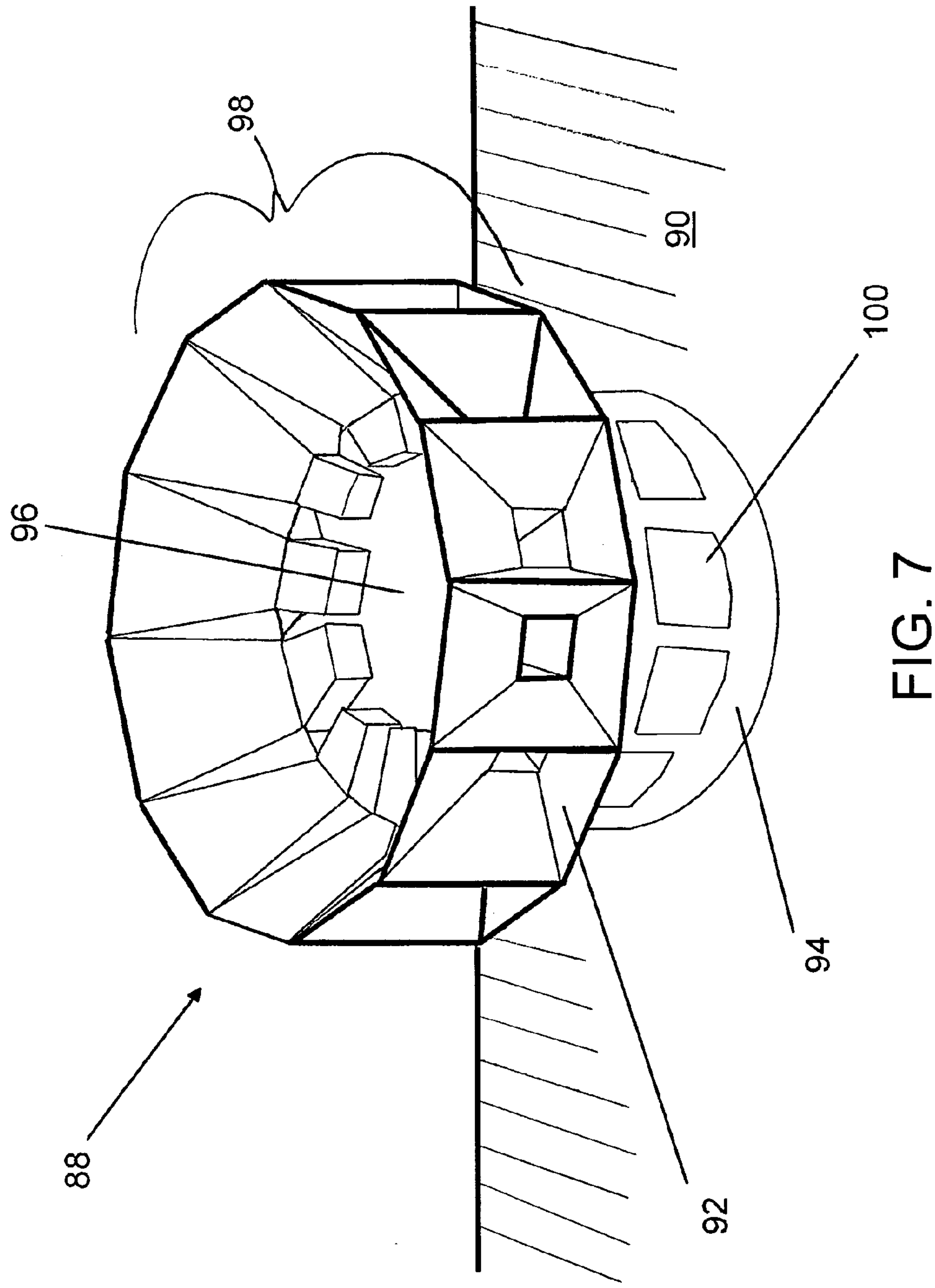
FIG. 7 is a top perspective view of a hybrid system of the present invention disposed on a marine vehicle.

Marine vehicles can be adapted to utilize a hybrid system consisting of both narrow-band and UWB, as illustrated in FIG. 7. Ships and boats must be able to avoid collisions with obstacles that have a wide range of scales, from the small (e.g., buoys, small craft, etc) to the large (e.g., other ships).

FIG. 7 illustrates a top perspective view of the hybrid antenna system 88 of the present invention disposed on the roof 90 of a marine vessel (not shown). Preferably, the exemplary hybrid antenna system 88 is located up on the highest portion of the marine vessel. The hybrid antenna system 88 has a plurality of equatorial horns 92 disposed on a cylindrical base 94. The horns 92 are positioned in order to allow the hybrid antenna system 88 to perform angle interpolation around the direction of the center 96 of this single-sector aligned cluster 98. Most likely, such a marine system would require a ring of contiguous horns 92 in order to facilitate 360-degree coverage. Although a total of twelve pyramidal horns are illustrated, with 30-degrees between the maximum response axes of these horns 92, any number of horns is contemplated. For example, a cluster of horns can contain eight equatorial horns having a 45-degree spacing to cover all of the "quarter-beam" compass regions around the marine vessel (with sixteen equatorial horns needed to cover all one-sixteenth compass directions). Another example is four equatorial horns to cover the primary compass directions, with the design choice being dictated by a compromise between the desired concept of operations and unit cost considerations.

The hybrid antenna system 88 also includes a circumferential array of patch-array antenna 100, which is disposed about the cylindrical base 94, following the previously described considerations related to interspersing patch-subarray antenna 100 in between the horns 92.

The shapes, construction and materials contemplated for the horns 92 and patch-array antenna 100 are as indicated above. The hybrid system of the present invention is contemplated to operate using the "sing-around" methodology as described herein. Specifically, the hybrid system is contemplated to operate in the 3.65 to 3.70 GHz joint marine/FAA microwave S-band.

As opposed to the previously mentioned examples of aircraft and terrain alerting and ground-proximity warning for general aviation applications, as well as Detection, See and Avoid (DS&A) operation for UAV applications, Synthetic Aperture Radar (SAR) can be used in the context of SAR operations involving high-resolution imagery for ground-surveillance and mapping purposes. Large strategic UAVs are too small to accommodate the physical size of a real microwave aperture required for ground surveillance and mapping. Therefore, in order to form a virtual microwave aperture for the present invention requires resorting to SAR-type transmissions and space-time reception digital recording and processing (replacing the original photographic recording and optical processing) as well as digital image processing. In order to operate a SAR in a focused mode, a form of coded-waveform transmission (usually, a continuous wave, frequency modulated (CT-FM) waveform) is described herein to be consistent with making the radial-range resolution equal to the focused SAR cross-range resolution imagery. Such a form of SAR produces cross-range resolution that is no smaller than half the physical dimension of the transmitting real aperture. This implies that the receiving virtual aperture (or cold aperture) must be governed in the SAR side-looking mode by setting half of the physical dimension of the transmitting aperture equal to the product of the virtual (or synthetic) aperture F-number (i.e., given by the intended maximum radial range of the port or the starboard "swath" coverage divided by the length of the virtual aperture) times the radar wavelength. In other words, the synthetic aperture length needed equals twice the intended maximum radial range (i.e., wherein, ground range is the radial range times the cosine of the elevation angle) times the radar wavelength divided by the cold aperture length. Such a synthetic aperture length is determined by the smaller of the space-time coherency limitation and the accuracy to which a GPS-guided inertial navigation system (GPS/INS) can measure the exact space-time trajectory of the UAV. By way of contrast, instead of utilizing a downward looking broadside-azimuth pointed 45-degree horn to support a SAR side-looking mode, one of the downward looking off-broadside-azimuth pointing 45-degree horns can be used. The consequence is that the synthetic aperture length is foreshortened by the cosine of the azimuth angle referenced to the broadside azimuth angle and, hence, the cross-range resolution is worsened by a factor of the secant of the azimuth-angle offset from broadside. For example, at 65-degrees from broadside, the cross-range resolution is worsened by a factor of 2.37:1; an unfortunate consequence in order to obtain SAR imagery prior to reaching the surveillance area.

Most of the passive Electro-Optical (EO) and Infrared (IR) designed for DS&A purposes or ground-surveillance imaging system applications installed upon UAVs, do not use stereo-optical systems for determining radial range within the forward Field-Of-View (FOV) (i.e., usually confined to +/−110-degrees of azimuth and +/−15-degrees of elevation). These passive EO/IR systems lack the ability to provide a radial-range, radial-range-rate and tau time-to-CPA or collision point. Most passive EO/IR systems intended to provide both a DS&A as well as a ground-surveillance imaging capability for UAVs use, three contiguous, canted digital camera apertures arrayed to provide coverage in both vertical and azimuthal directions. In a preferred embodiment, a hybrid system can utilize three equatorial pyramidal horns and a one up and one down 45-degree tilted pyramidal horns (i.e., for a total of a five-channel cluster capable of being scanned to any angle in 360-degrees of azimuth). These horns can be co-mounted upon a UAV "chin-mounted" 360-degree mechano-optical rotated table to provide radial range, radial range rate (and, hence, a tau estimate) as well as azimuth and elevation angle. This embodiment allows for the elevation angle to be interpolated to within about a degree of accuracy over the +/−110-degrees of azimuth and the +/−15-degrees of elevation FOV coverage around any scan angle.

There are several advantages of the collision alerting and avoidance system of the present invention. The present invention utilizes an array of fixed, fuselage-mounted horns, each responsible for covering a particular sector of the surrounding volume (given by a range of azimuth angle, elevation angle and radial distance from the aircraft) such that the total coverage adds up to $4\pi$-steradians out to a range of about 4 to about 7 nautical miles. The "sing-around" method allows for the use of relatively inexpensive and small application-specific integrated circuits (ASICs).

The "sing-around" method utilizes a single channel per beam for deferred decision processing to reduce the false-alarm rate. The "sing-around" method is able to adjust the PRF for affecting correspondingly rapid increases in information rate on rapidly closing targets.

The exemplary embodiment for use with general aviation aircraft and large UAVs provides several safety and efficiency benefits. The present invention provides a safety backup for the event of electronics failure on cooperative aircraft (which would make ADS-B unavailable or transponder detectors useless). In the future, when Airborne Separation Assistance System (ASAS) applications are sought using ADS-B, the primary surveillance from the present invention can facilitate the certification of such applications by providing an independent primary radar surveillance mode. The present invention provides an independent primary radar surveillance mode and provides a complete collision prevention function against all aircraft, making use of the best surveillance information available and providing protection against failure modes.

The collision avoidance system of the present invention utilized with small, tactical UAV encompasses UWB to detect smaller, close-in fixed targets, constituting obstacles. This embodiment provides range, bearing and closure rate, as well as off-to-the-side range rate. All of this is achieved through the use of the "sing-around" design and without the use of expensive and heavy phased array components. The resulting system is expected to be light weight (less than about 10 lb), low power (less than about 10 Watts) and low cost.

The collision avoidance system of the present invention utilized with marine vehicles encompasses both narrow-band and UWB to detect both small and large obstacles. This provides ample detection area and protection for the marine vessels.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention.

What is claimed is:

1. A collision alerting and avoidance system for use in an aerial vehicle comprising:

at least one low profile antenna array disposed on the aerial vehicle, said at least one low profile antenna array including a plurality of horns, said plurality of horns including at least one polar horn, a plurality of 45-degree horns, and a plurality of equatorial horns;

at least one transmitter/receiver probe coupled to each of said at least one polar horn, said 45-degree horns, and said equatorial horns, each said transmitter/receiver probe configured to operate in a transmit mode to transmit electromagnetic waves and a receive mode to receive an echo signal reflected from an obstacle in the area of the aerial vehicle;

a plurality of transmitter/receiver modules coupled to each of said transmitter/receiver probes, each said transmitter/receiver module configured to operate in a transmit mode to produce electromagnetic waves for transmission and a receive mode to receive said echo signal; and a processor coupled to said plurality of transmitter/receiver modules, said processor configured to control transmission of said electromagnetic waves from said horns and to process said echo signal to provide an output signal containing information regarding said obstacle.

2. The collision alerting and avoidance system of claim 1, further comprising:

a display coupled to said processor for displaying said information to an operator of the aerial vehicle, said information enables said operator to take appropriate action to avoid said obstacle.

3. The collision alerting and avoidance system of claim 1, further comprising:

a flight control system coupled to said processor for processing said information in order to take action to avoid said obstacle.

4. The collision alerting and avoidance system of claim 1, wherein the aerial vehicle is a general aviation aircraft, and the collision alerting and avoidance system acts primarily as an alerting system.

5. The collision alerting and avoidance system of claim 1, wherein the aerial vehicle is an unmanned aerial vehicle, and the collision alerting and avoidance system acts primarily as an avoidance system in coordination with a flight control system.

6. The collision alerting and avoidance system of claim 1, further comprising:

a low-drag radome covering said antenna array.

7. The collision alerting and avoidance system of claim 1, further comprising:

a plurality of communication links selected from the group consisting of TCAS, ADS-B, TIS-B, and FIS-B, coupled to the collision alerting and avoidance system.

8. The collision alerting and avoidance system of claim 1, further comprising:

a second antenna array disposed in electrical communication with said at least one antenna array and said processor, said second antenna array including a plurality of horns, said plurality of horns including at least one polar horn, a plurality of 45-degree horns, and a plurality of equatorial horns.

9. The collision alerting and avoidance system of claim 1, further comprising:

a conductive metal coating disposed on an interior of said horns.

10. The collision alerting and avoidance system of claim 1, wherein said at least one transmitter/receiver probe transmits another said electromagnetic wave upon receipt of said echo signal.

11. The collision alerting and avoidance system of claim 1, wherein said processor is configured to determine a range-rate estimation of said obstacle to the aerial vehicle by varying a pulse-repetition frequency based on said information and to determine a time to closest approach to said obstacle as a ratio of a range to said range-rate estimation.

12. The collision alerting and avoidance system of claim 11, wherein said processor is configured to transmit said electromagnetic waves simultaneously from said horns.

13. A method of using a collision alerting and avoidance system on an aerial vehicle comprising:

disposing at least one low profile antenna array on the aerial vehicle, said at least one low profile antenna array including a plurality of horns, said plurality of horns including at least one polar horn, a plurality of 45-degree horns, and a plurality of equatorial horns;

coupling at least one transmitter/receiver probe to each of said at least one polar horn, said 45-degree horns, and said equatorial horns, each said transmitter/receiver probe configured to operate in a transmit mode and a receive mode;

coupling at least one transmitter/receiver module to each of said transmitter/receiver probes, said at least one transmitter/receiver module configured to produce at least one electromagnetic wave in a transmit mode and to receive an echo signal in a receive mode;

transmitting said at least one electromagnetic wave from at least one of said transmitter/receiver probes;

detecting said echo signal reflected from an obstacle in the area of the aerial vehicle in said at least one transmitter/receiver probe and said at least one transmitter/receiver module;

transmitting another electromagnetic wave from said at least one transmitter/receiver probe and said at least one transmitter/receiver module upon receipt of said echo signal; and processing said echo signal in a processor coupled to said plurality of transmitter/receiver modules to provide an output signal containing information regarding said obstacle.

14. The method of claim 13, further comprising:

determining a range-rate estimation of said obstacle to the aerial vehicle by varying a pulse-repetition frequency based on said information; and determining a time to closest approach to said obstacle as a ratio of range to said range-rate estimation.

15. The method of claim 13, further comprising:

displaying said information to an operator of the aerial vehicle, wherein said information enables said operator to take action to avoid said obstacle.

16. The method of claim 13, further comprising:

coupling a flight control system to said processor for processing said information to enable the aerial vehicle to take action to avoid said obstacle.

17. The method of claim 13, wherein the aerial vehicle is a general aviation aircraft.

18. The method of claim 13, wherein the aerial vehicle is an unmanned aerial vehicle.

19. The method of claim 13, further comprising:

disposing a low-drag radome over said antenna array.

20. The method of claim 13, further comprising:

electrically coupling a plurality of communication links to the collision alerting and avoidance system, said plurality of communication links selected from the group consisting of TCAS, ADS-B, TIS-B, and FIS-B.

21. The method of claim 13, further comprising:

coupling a second antenna array in electrical communication with said at least one antenna array and said processor, said second antenna array including a plurality of horns, said plurality of horns including at least one polar horn, a plurality of 45-degree horns, and a plurality of equatorial horns.

22. The method of claim 13, further comprising:

disposing a conductive metal coating on an interior of said horns.

23. The method of claim 13, further comprising:

transmitting said electromagnetic waves simultaneously from said horns.

* * * * *